(12) United States Patent
Sakai et al.

(10) Patent No.: US 11,412,178 B2
(45) Date of Patent: Aug. 9, 2022

(54) INFORMATION PROCESSING DEVICE, INFORMATION PROCESSING METHOD, AND PROGRAM

(71) Applicant: SONY CORPORATION, Tokyo (JP)

(72) Inventors: Yusuke Sakai, Kanagawa (JP); Tadamichi Shimogawara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/083,755

(22) Filed: Oct. 29, 2020

(65) Prior Publication Data

US 2021/0136323 A1 May 6, 2021

(30) Foreign Application Priority Data

Oct. 31, 2019 (JP) .............................. JP2019-198779

(51) Int. Cl.
*H04N 7/14* (2006.01)
*G10L 15/18* (2013.01)
*G10L 15/22* (2006.01)

(52) U.S. Cl.
CPC ......... *H04N 7/142* (2013.01); *G10L 15/1815* (2013.01); *G10L 15/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,007,422 | B1* | 4/2015 | Kwon | G06T 19/006 348/14.03 |
| 9,329,767 | B1* | 5/2016 | Teller | G06F 3/0488 |
| 2017/0337919 | A1* | 11/2017 | Kato | G10L 15/063 |
| 2018/0160074 | A1* | 6/2018 | Mercredi | H04L 51/32 |
| 2020/0380991 | A1* | 12/2020 | Ge | G06F 40/279 |
| 2021/0097978 | A1* | 4/2021 | Mei | G06F 40/35 |
| 2021/0183365 | A1* | 6/2021 | Noda | G10L 15/02 |

* cited by examiner

*Primary Examiner* — Phung-Hoang J Nguyen
(74) *Attorney, Agent, or Firm* — Oblon, McClelland, Maier & Neustadt, L.L.P.

(57) ABSTRACT

An information processing device includes a supplementary processing unit configured to perform supplementary processing of supplementing communication between users at a plurality of points in accordance with a context of interaction between the users at the respective points in a telepresence system configured to perform bidirectional image and sound communication for the communication.

12 Claims, 9 Drawing Sheets

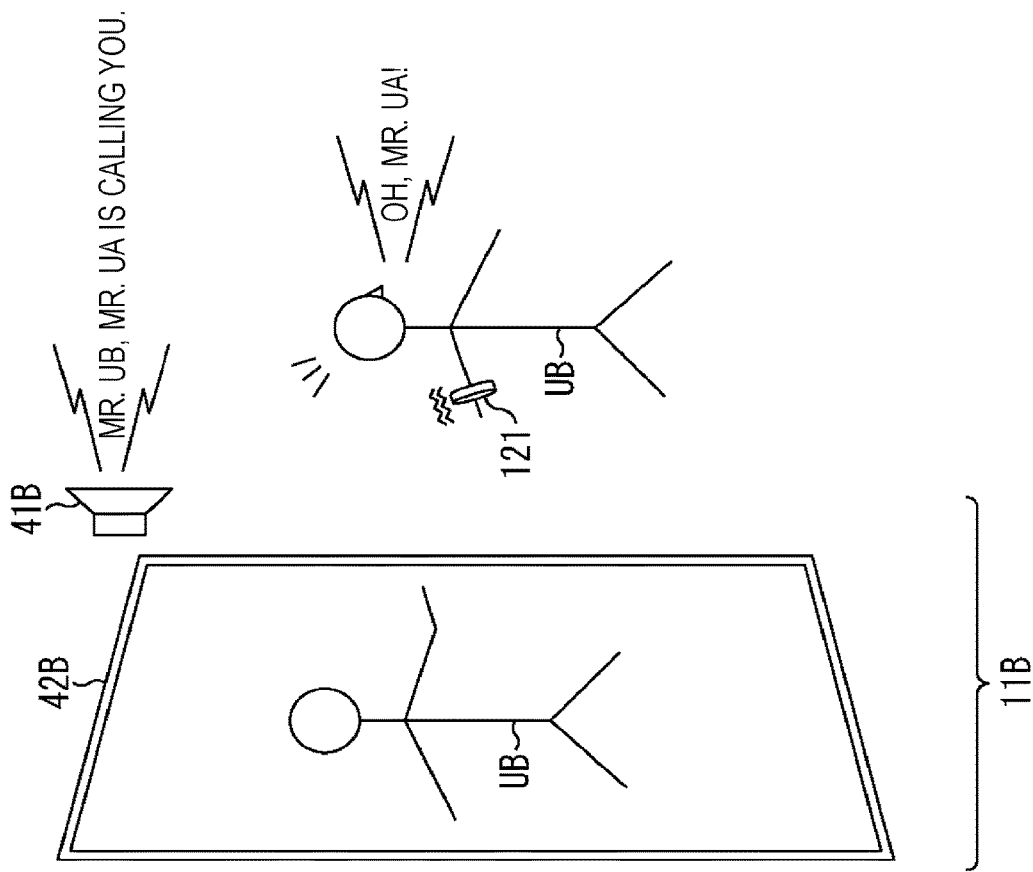
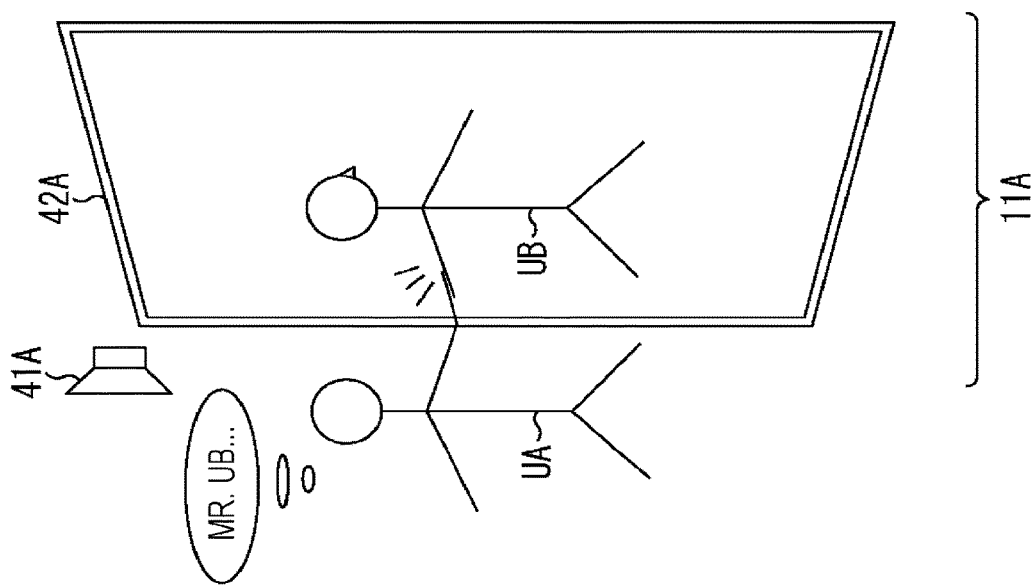
FIG. 7

INFORMATION PROCESSING DEVICE, INFORMATION PROCESSING METHOD, AND PROGRAM

CROSS REFERENCE TO RELATED APPLICATIONS

This application claims the benefit of Japanese Priority Patent Application JP 2019-198779 filed on Oct. 31, 2019, the entire contents of which are incorporated herein by reference.

TECHNICAL FIELD

The present technology relates to an information processing device, an information processing method, and a program, and more particularly relates to, for example, an information processing device, an information processing method, and a program capable of facilitating smooth communication.

BACKGROUND ART

For example, PTL 1 proposes a video communication system that senses a scene transition in accordance with a scene analysis algorithm, corrects video capture settings in accordance with an algorithm for image capture management to match the transition, and applies a privacy protection setting to an operation of capturing, sending, displaying, or recording moving images of a local environment and a person in the local environment to manage the operation.

In addition, for example, PTL 2 proposes a videoconference system connectable to terminal devices of different manufacturers and different models, and capable of creating minutes as images with voice and subtitles, while eliminating the need for limiting language of conference participants (speakers) to specific language in creating the minutes.

CITATION LIST

Patent Literature

[PTL 1]
JP 2010-529738 A
[PTL 2]
JP 2013-201505 A

SUMMARY

Technical Problem

In the meantime, a telepresence system has become a focus of attention as a communication tool that enables users in remote locations to enjoy a feeling as if they were facing each other.

The telepresence system has been requested to enable not only a user who has a normal cognitive function, but also a user who has a reduced cognitive function, such as an elderly person, to have smooth communication.

In view of such circumstances, the present technology is provided for facilitating smooth communication.

Solution to Problem

An information processing device or a program according to an embodiment of the present technology is an information processing device including a supplementary processing unit configured to perform processing, the processing including supplementary processing of supplementing communication between users at a plurality of points in accordance with a context of interaction between the users at the respective points in a telepresence system configured to perform bidirectional image and sound communication for the communication, or a program that causes a computer to function as such an information processing device.

An information processing method according to an embodiment of the present technology is an information processing method, including: performing supplementary processing of supplementing communication between users at a plurality of points in accordance with a context of interaction between the users at the respective points in a telepresence system configured to perform bidirectional image and sound communication for the communication.

According to an embodiment of the present technology, supplementary processing of supplementing communication between users at a plurality of points in accordance with a context of interaction between the users at the respective points in a telepresence system configured to perform bidirectional image and sound communication for the communication is performed.

The information processing device may be an independent device or an internal block that constitutes a single device.

The program may be provided by being transmitted via a transmission medium or recorded on a recording medium.

BRIEF DESCRIPTION OF DRAWINGS

FIG. 7 is a diagram illustrating another example of how communication using the telepresence system 10 proceeds.

DESCRIPTION OF EMBODIMENTS

Telepresence System According to an Embodiment of the Present Technology

Figure 1:
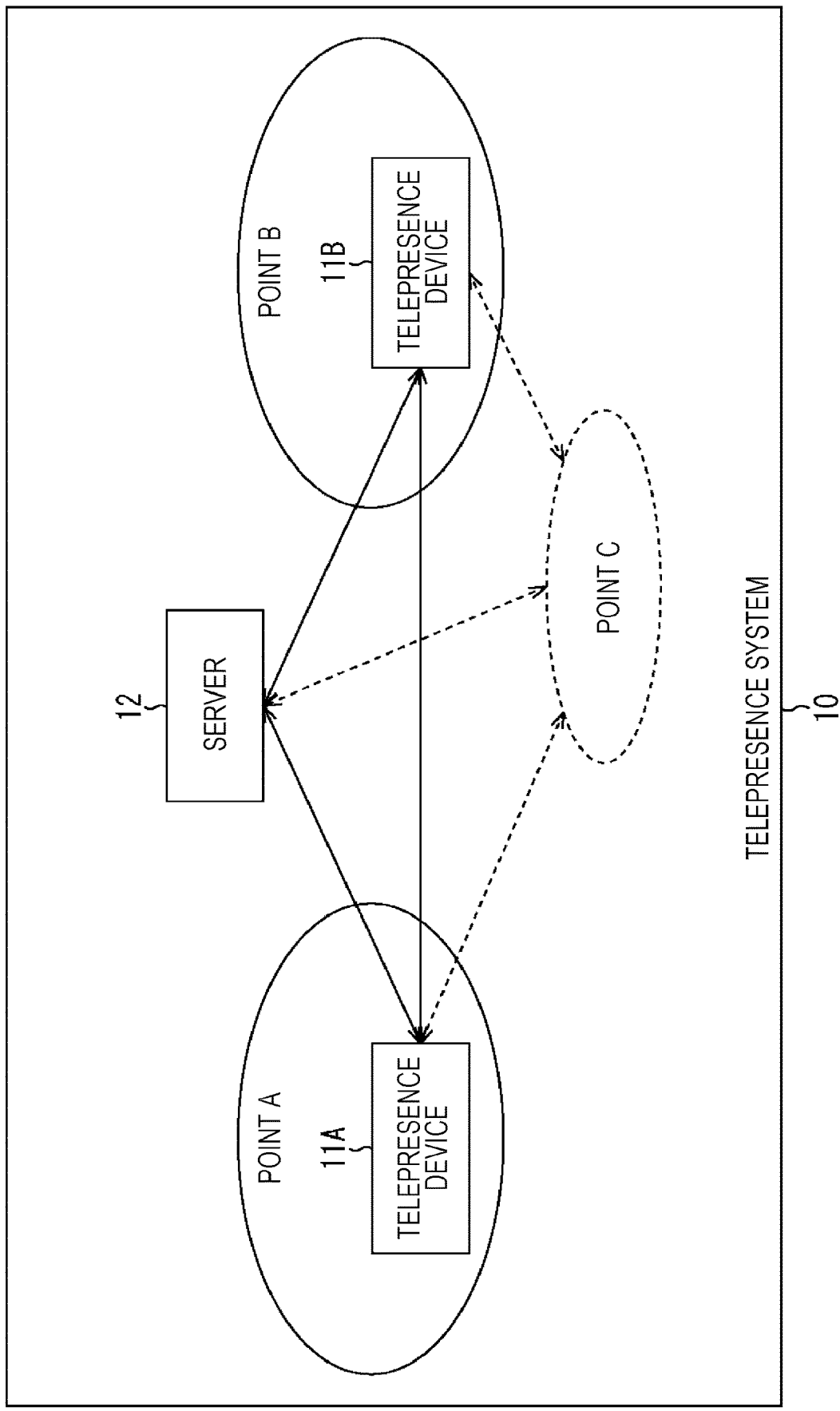
FIG. 1 is a diagram illustrating a configuration example of a telepresence system according to an embodiment of the present technology.

FIG. 1 is a diagram illustrating a configuration example of a telepresence system according to an embodiment of the present technology.

A telepresence system 10 performs bidirectional image and sound communication for communication between users at a plurality of points.

In FIG. 1, the telepresence system 10 includes telepresence devices 11A and 11B, and a server 12.

The telepresence device 11A is arranged at a point A. At the point A, the telepresence device 11A captures images, collects sounds, and sends (transmits) the images and sounds to the telepresence device 11B at a point B.

In addition, the telepresence device 11A receives and presents images and sounds (displays images and outputs sounds) that have been captured/collected by the telepresence device 11B and that are sent from the telepresence device 11B. With this configuration, the telepresence device 11A, for example, displays a space at the point B as if a space at the point A and the space at the point B were directly connected to each other.

The telepresence device 11B is arranged at the point B different from the point A, and performs processing similar to that performed by the telepresence device 11A. That is, at the point B, the telepresence device 11B captures images, collects sounds, and sends the images and sounds to the telepresence device 11A at the point A. In addition, the telepresence device 11B receives and presents images and sounds that have been captured/collected by the telepresence device 11A and that are sent from the telepresence device 11A.

With this configuration, the telepresence device 11B, for example, displays a space at the point A as if the space at the point A and the space at the point B were directly connected to each other.

In a case where the telepresence devices 11A and 11B need not be differentiated from each other, the telepresence devices 11A and 11B are also described as a telepresence device 11.

A server 12 performs control of the telepresence device 11 and provides information that the telepresence device 11 may want to the telepresence device 11, as necessary. Note that the telepresence system 10 in FIG. 1 performs the bidirectional image and sound communication at the two points, i.e., the points A and B, but the telepresence system 10 may perform the bidirectional image and sound communication, besides at the points A and B, at three points, i.e., a point C in addition to the points A and B, or four or more points.

In the following description, assume that the telepresence system 10 may perform the bidirectional image and sound communication at the two points, i.e., the points A and B to simplify the explanation.

The telepresence system 10 provides an interactive environment by exchanging images and sounds, for example, at the points A and B as a plurality of points in remote locations in real time, and causing users at the points A and B to enjoy a feeling as if they were in adjacent spaces.

The telepresence system 10 performs, for example, supplementary processing of supplementing communication in accordance with a context of interaction between the respective users at the points A and B.

In the supplementary processing, for example, character information (visible information) to make a conversation between the users smooth is displayed in real time.

Here, for example, many residents in elderly housing have dementia, and there exist elderly people who are often unable to hear a conversation, elderly people who have difficulty in reading a context of a conversation, and the like. To make communication of such elderly people smooth, the telepresence system 10, for example, supports a conversation by presenting information regarding a content of a user's utterance in accordance with the user's voice, facial expression, and action as character information with an effect being added thereto as appropriate.

That is, the elderly housing is one of diversity environments where there lives a diversity and variety of users not only from a viewpoint of age and sex, but also from various viewpoints of visual and hearing abilities, an ability to understand language, situation recognition, a speaking ability, and the like. In such a diversity environment, the telepresence system 10 promotes communication such as a more comfortable and natural conversation by presenting the user with not only a normal voice of a conversation or the like, but also additional information in accordance with a context (state/situation) of a content of the conversation or the like.

For example, a conversation skill is an important skill to make communication smooth for care-workers who support users who have dementia. However, the care-workers may find it difficult to have enough time to take care of the users who have dementia in actual. In communication between the elderly people as the residents of the elderly housing, the elderly people tend to have likes and dislikes, and it is highly likely that an elderly person who has dementia and strong persistence is left out of the group. The telepresence system 10, for example, plays a role of positively promoting communication (connection) with the elderly people as the residents of the elderly housing.

The other party (target) who has communication with an elderly person may be not only the other residents of the elderly housing but also anyone including family members and children in the community. If information regarding the elderly person such as narrative information of the elderly person is input to the telepresence system 10 preliminarily or dynamically, the other party who has communication with the elderly person can acquire the information of the elderly person and have a smooth conversation.

Here, existing videoconference systems and video chat applications have been developed basically with the aim of a conference and/or a clear topic of discussion, and suppose businessmen at work and/or young people having high information technology (IT) literacy as users who use the system and applications. Thus, an operation method or the like of adjusting images and sounds and other operations have been designed supposing that users have almost similar abilities (average abilities of healthy people) to comprehend things, and the operation method may be complicated in some cases.

In a case where such a videoconference system or the like is introduced, for example, in the elderly housing where the elderly people live to promote communication of the elderly people, a diversity of literacy and ability (range in distribution of literacy and ability) of the elderly people as the users exceeds the supposition, which makes it difficult to provide necessary functions to the users.

For example, typically, a staff of the elderly housing or the like may perform an initialization operation or the like for a videoconference system or the like. However, it is difficult for the videoconference system or the like to provide functions having enough allowances in the following points: whether the elder person can see images of the other party; the elder person can hear a voice of the other party; the elder person can physically express his/her own facial expression and/or gesture and convey his/her voice to make himself/herself understood by the other party; and other points. For example, an elderly person having an impaired visual and/or hearing ability may be unable to see a user at the other end side and/or unable to hear an utterance of the user at the other end side in some cases, and the elderly person also may become anxious about whether his/her own utterance can be heard by the user at the other end side.

In addition, especially in a case where an elderly user has a reduced cognitive function such as a sense of vision and a sense of hearing or in a case where an elderly user suffers from dementia, the elderly user tends to make a failure in communication, such as a failure to convey his/her intention well and a failure to understand the other party's intention correctly, for example. Such a failure in communication further lowers motivation for having communication, and leads to a vicious cycle of lowering the user's communication ability.

The telepresence system 10 recognizes the user, refers to information regarding the user (personal information), makes an optimum system setting in accordance with a context, and furthermore, recognizes utterance information and operational information and provides (displays) captions (character information) in real time. This configuration, even in a case where there is a gap between cognitive abilities of users, can make the users' mutual intentions easy to convey, generate enjoyment of communication, and satisfy an affiliative drive, while increasing a success rate of communication attempts. Furthermore, the configuration can maintain and boost motivation for having communication.

As described above, the telepresence system 10 is not a target-oriented system on which the existing videoconference systems and the like place importance, but is a system intended to activate casual communication such as a daily conversation.

Here, television broadcasting or the like provides a caption function with consideration for accessibility, but the caption function is a caption function of, not an interactive and real-time type, but a delivery type for produced news, programs, and movies. Hence, the caption function for the television broadcasting or the like is not a function implemented in real time and in parallel between various points (locations) in an interactive environment like the telepresence system 10.

Skype for Business of Microsoft Corporation or the like makes a simultaneous interpreter intervene in a specific conference, thereby turning into actual utilization of a service of adding interactive captions (information) in real time in a conference between remote locations and using different languages. The Skype for Business or the like, however, is high in cost for personnel, automated translation, artificial intelligence (AI), and the like, and is difficult to be introduced to a case where the telepresence system 10 to connect spaces on a steady basis without any purpose and promote communication is scheduled to be applied.

A digital signage device or the like causes a built-in camera to capture an image, and displays the image like a mirror image to a user standing in front of a display. Furthermore, the digital signage device recognizes the face, body, movement, and the like of the user in the image to superimpose a virtual reality (VR)/augmented reality (AR) image of a headdress like a mask on the user or add such an image effect as to generate waves and/or light in accordance with gestures. However, the digital signage device or the like is not a device for bidirectional exchange between remote locations like the telepresence system 10.

There is an application that bidirectionally presents such an image effect as that generated by the digital signage device, as an example of an accessory application of a camera for a video chat. A function presented by the accessory application is a function to cause a user to select a conspicuous visual effect pattern. Further, the function presented by the accessory application is not designed with the aim of supporting the elderly people and disabled people having trouble in normal communication and complementing a gap in cognitive ability like the telepresence system 10.

The telepresence system 10 is a system for connecting users in remote locations with each other as if they were in the same space to facilitate natural communication, and for example, the telepresence system 10 connects spaces such as the elderly housing on a steady basis.

For example, in the telepresence system 10, a user at the point A can visually recognize a space at the point B in a remote location and hear voices and noises at the point B with the telepresence device 11A arranged at the point A. Similarly, a user at the point B can visually recognize a space at the point A in a remote location and hear voices and noises at the point A with the telepresence device 11B arranged at the point B.

This configuration enables the users at the points A and B to enjoy a feeling as if they were in adjacent spaces. The telepresence system 10 is especially useful in a space having a large diversity in cognitive abilities of the elderly people, disabled people, and others.

However, the telepresence system 10 can be applied to, for example, a typical office, a public facility, and home, besides such a space.

Configuration Example of Telepresence Device 11A

Figure 2:
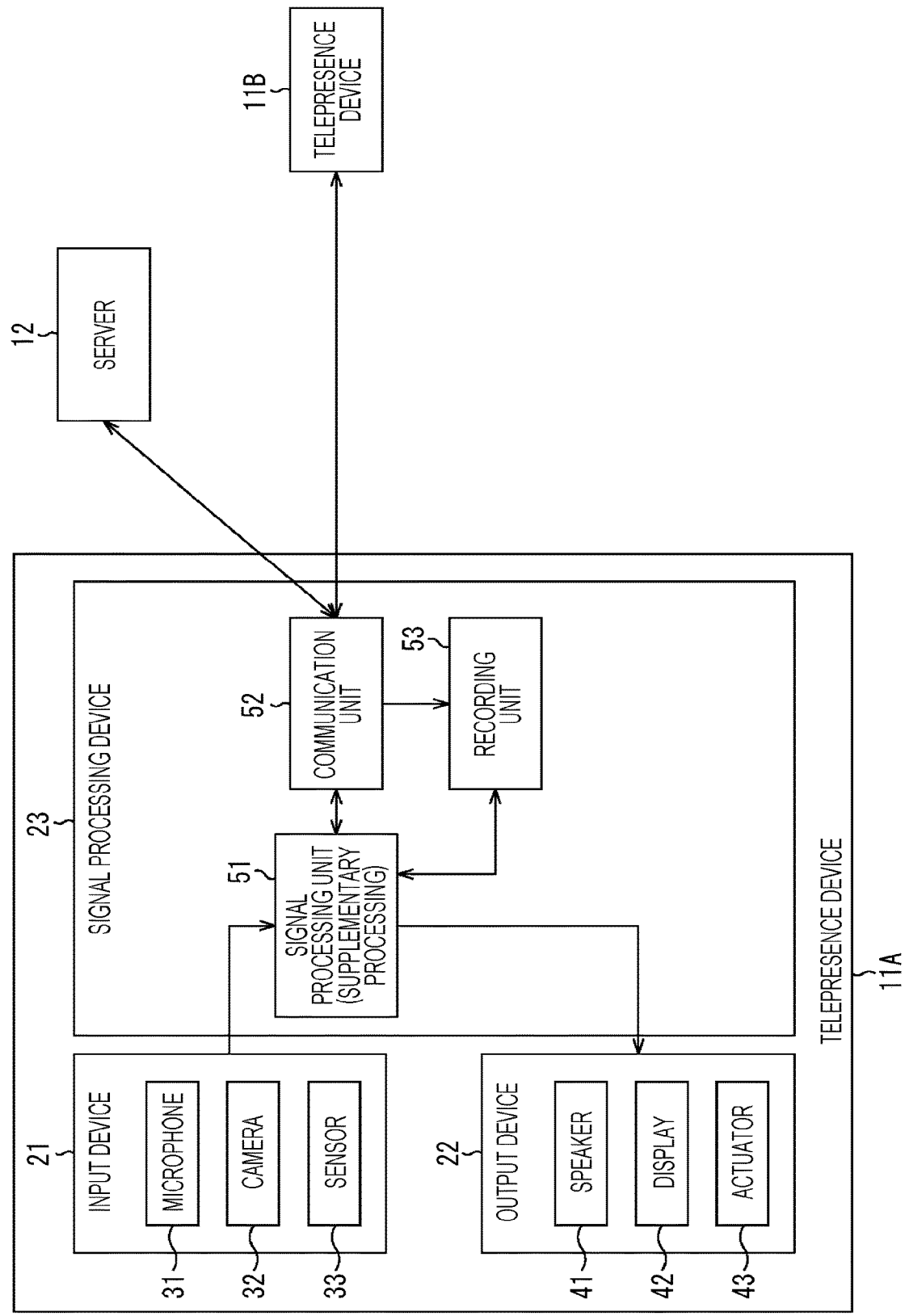
FIG. 2 is a block diagram illustrating a configuration example of a telepresence device 11A.

FIG. 2 is a block diagram illustrating a configuration example of a telepresence device 11A.

Note that the telepresence device 11B is also configured similarly to the telepresence device 11A illustrated in FIG. 2.

The telepresence device 11A includes an input device 21, an output device 22, and a signal processing device 23. The input device 21 senses information (physical quantity) and supplies the information to the signal processing device 23. In FIG. 2, the input device 21 includes a microphone 31, a camera 32, and a sensor 33. The microphone 31 collects (senses) sounds and supplies the sounds to the signal processing device 23. The camera 32 captures images (senses light) and supplies the images to the signal processing device 23. The sensor 33 senses biological information, such as a body temperature, amount of sweating, blood pressure, and heart rate of a user, and other physical quantities such as an ambient temperature and a distance, and supplies the information to the signal processing device 23. The physical quantities sensed by the sensor 33 are not specifically limited.

The output device 22 outputs various kinds of information in accordance with control of the signal processing device 23. In FIG. 2, the output device 22 includes a speaker 41, a display 42, and an actuator 43.

The speaker 41 and the display 42 present information. The speaker 41 presents the information by sound. The display 42 presents the information by image. The actuator 43, for example, vibrates. Besides the actuator that vibrates, an actuator that adjusts a temperature, an actuator that generates a smell, a wind, and the like, and another freely-selected actuator may be employed as the actuator 43.

While one microphone 31, camera 32, and sensor 33, and one speaker 41, display 42, and actuator 43 are illustrated in FIG. 2, a plurality of microphones 31, cameras 32, and sensors 33, and a plurality of speakers 41, displays 42, and actuators 43 may be provided as appropriate.

The signal processing device 23 performs necessary processing on information supplied from the input device 21, and sends the information to, for example, the telepresence device 11B as another telepresence device, as necessary. In addition, the signal processing device 23 receives information sent from, for example, the telepresence device 11B as another telepresence device, performs necessary processing on the information, and causes the output device 22 to output the information, as necessary.

The signal processing device 23 includes a signal processing unit 51, a communication unit 52, and a recording unit 53.

The signal processing unit 51 performs necessary processing on the respective sounds and images supplied from the microphone 31 and camera 32 of the input device 21, and supplies the sounds and images to the communication unit 52.

In addition, the signal processing unit 51 performs necessary processing on sounds and images from the telepresence device 11B, which are supplied from the communication unit 52, and causes each of the speaker 41 and display 42 of the output device 22 to present the sounds and images. That is, the signal processing unit 51 causes the speaker 41 to output the sounds, and causes the display 42 to display the images.

Furthermore, the signal processing unit 51 recognizes a user reflected on images from the camera 32 of the input device 21, and recognizes a context of interaction between respective users at the points A and B.

In addition, the signal processing unit 51 performs the supplementary processing of supplementing communication between the respective users at the points A and B in accordance with a result of recognizing the user and a result of recognizing the context of interaction.

The communication unit 52 communicates with the server 12 and the telepresence device 11B. For example, the communication unit 52 sends the sounds and images supplied from the signal processing unit 51 to the telepresence device 11B. In addition, for example, the communication unit 52 receives the sounds and images sent from the telepresence device 11B, and supplies the sounds and images to the signal processing unit 51.

The recording unit 53 records various kinds of information. For example, the recording unit 53 records information handled in the signal processing unit 51 and the communication unit 52, information input from the outside of the telepresence device 11A, and other information. The information recorded in the recording unit 53 can be used for processing or the like of the signal processing unit 51.

In the telepresence device 11A, the signal processing unit 51 performs personal recognition of the user who utilizes the telepresence device 11A by performing facial recognition using the images captured by the camera 32 using, if necessary, an output from the sensor 33 in combination. With this processing, the signal processing unit 51 identifies the user who utilizes the telepresence device 11A. The user who utilizes the telepresence device 11A is, for example, a user who has come close to the telepresence device 11A.

Characteristic information of the user is recorded in the recording unit 53 as one of information of the user. The signal processing unit 51 refers to the characteristic information of the user identified by the personal recognition out of pieces of characteristic information recorded in the recording unit 53 to perform the supplementary processing in accordance with the characteristic information.

The characteristic information of the user includes, for example, user information regarding a visual ability (resolution, field of view, color sensitivity, brightness sensitivity, and the like), a hearing ability (resolution, gain, frequency response characteristic, and the like), an ability to understand language (language, vocabulary, listening ability, and the like), knowledge, a genre, a cognitive ability (level of dementia, symptom, and the like), a hobby, and a special skill, and information of life (origin, carrier, specialty, and the like).

When the user utilizes the telepresence system 10, the telepresence device 11A dynamically records, for example, log information (utilization situation, case examples of past positive/negative communication, and the like), correlated information of communication with residents and acquaintances (chemistry, common subjects, elements, and previous interaction logs), and the like in the recording unit 53. The characteristic information also includes the log information, correlated information of communication, and other information dynamically recorded in the recording unit 53 in this manner.

When the user utilizes the telepresence system 10, the signal processing unit 51 recognizes a context in real time such as the state of the user and the situation of a surrounding space from the information (sounds (voices) collected by the microphone 31, images captured by the camera 32, and a result of sensing of biological information by the sensor 33) supplied from the input device 21. By recognizing the context, the signal processing unit 51 analyzes and collects information of an emotion, psychological state, and others of the user perceived by an actual care-worker who pays careful attention to the user. The information of the emotion, psychological state, and others is, for example, information that the user is wanting to tell something or call someone, having fun, feeling anxious, angry, having trouble in hearing a voice of the other party, and unable to grasp what the other party tells and/or a situation.

Configuration Example of Signal Processing Unit 51

Figure 3:
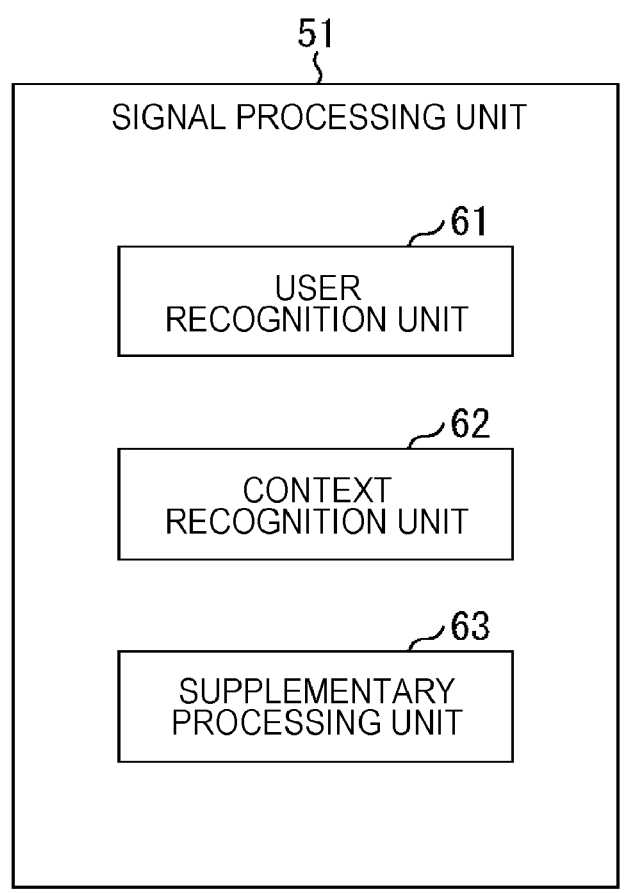
FIG. 3 is a block diagram illustrating a configuration example of a signal processing unit 51.

FIG. 3 is a block diagram illustrating a configuration example of a signal processing unit 51.

The signal processing unit 51 includes a user recognition unit 61, a context recognition unit 62, and a supplementary processing unit 63.

The user recognition unit 61 performs personal recognition of the user whose images are captured by the camera 32.

The context recognition unit 62 recognizes a context of interaction (hereinafter also referred to as an interaction context) between the users at the respective points in the telepresence system 10. For example, the context recognition unit 62 recognizes at least one or more of the state of the user recognized by the user recognition unit 61, a context of a past conversation held by the user, a context of a current conversation being held the user, and the like, as the interaction context.

The supplementary processing unit 63 performs the supplementary processing of supplementing communication between the users at the different points in accordance with the interaction context recognized by the context recognition unit 62, and the like.

Usage Example of Telepresence Device 11

Figure 4:
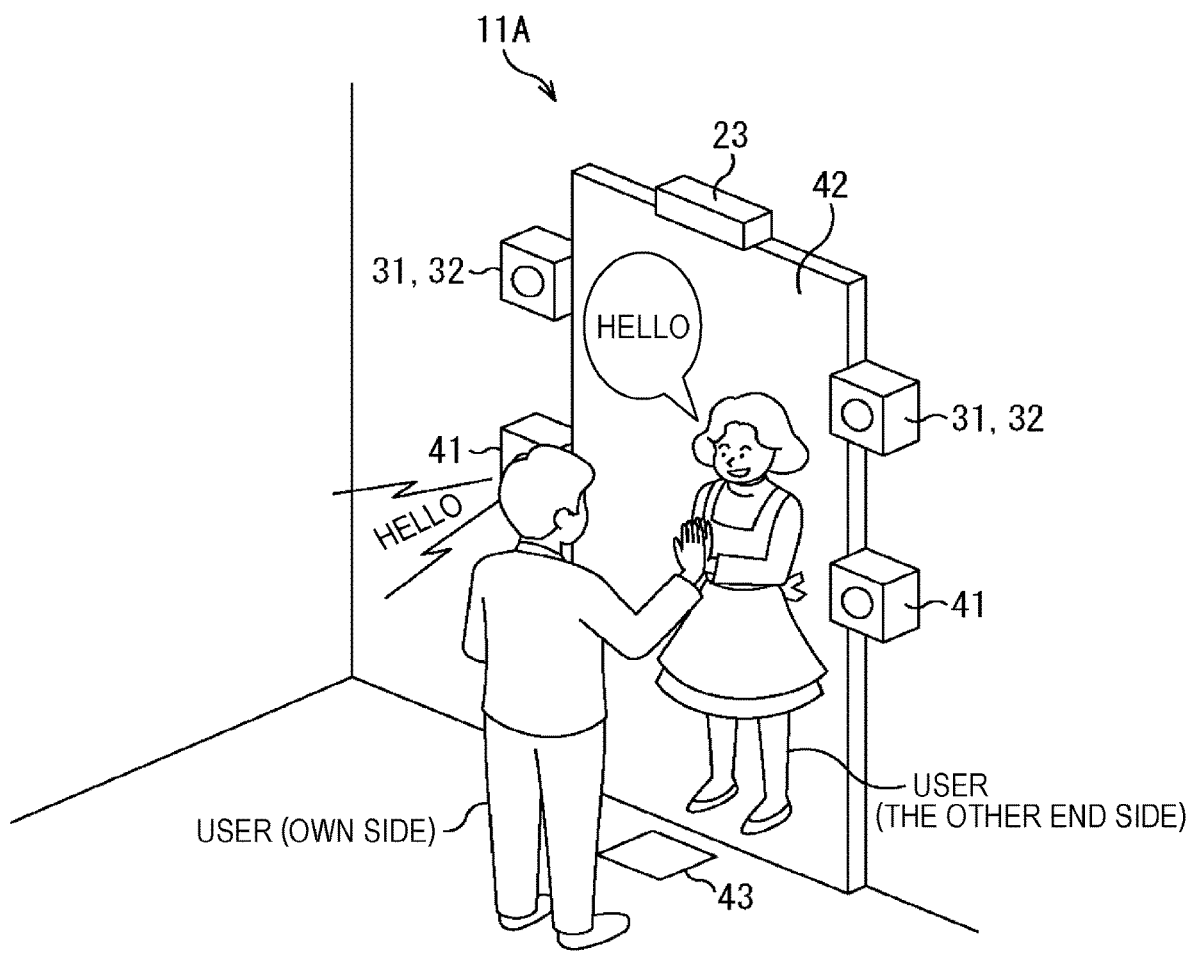
FIG. 4 is a perspective view explaining a usage example of a telepresence device 11.

FIG. 4 is a perspective view explaining a usage example of a telepresence device 11.

The telepresence device 11 includes: the microphone 31, the camera 32, and the sensor 33 that constitute the input device 21; the speaker 41, the display 42, and the actuator 43 that constitute the output device 22; and the signal processing device 23.

Note that FIG. 4 does not illustrate the sensor 33. In addition, the microphone 31 and the camera 32 are integrally formed in FIG. 4.

The telepresence device 11 can provide communication experience as if the users in the remote locations, for example, the user at the point A and the user at the point B were in proximity.

Here, in the following description, a user side of a user in front of the display 42 illustrated in FIG. 4 is referred to as an own side, and a user side of a user reflected on the display 42 is referred to as the other end side, as appropriate. If the telepresence device 11 on the own side is, for example, the telepresence device 11A at the point A, the telepresence device 11 on the other end side is, for example, the telepresence device 11B at the point B.

The speaker 41 outputs sounds sent from the telepresence device 11 on the other end side. The display 42 displays images sent from the telepresence device 11 on the other end side, and reflects a space on the other end side on a screen.

Meanwhile, the microphone 31 collects sounds on the own side. The camera 32 captures images of a space on the own side. The sounds collected by the microphone 31 and the images captured by the camera 32 are sent to the telepresence device 11 on the other end side, and presented similarly to the telepresence device 11 on the own side.

In the telepresence device 11, for example, the sounds on the other end side (the sounds sent from the telepresence device 11 on the other end side) are output from the speaker 41, and in addition, displayed as character information on the display 42, as necessary.

For example, the character information (caption) of a content of an utterance of the user on the other end side reflected on the display 42 is displayed together with a speech bubble indicating the utterance of the user on the other end side.

Consequently, the user on the own side, even if having a reduced haring ability, can recognize (perceive) the user who has uttered and a content of the utterance by seeing the character information with the speech bubble displayed on the display 42.

The supplementary processing unit 63 performs the supplementary processing of supplementing communication between the users, for example, by displaying the character information of the content of the utterance of the user on the other end side, as described above. The supplementary processing can be performed in accordance with the user personally recognized by the user recognition unit 61, the interaction context recognized by the context recognition unit 62, and the like.

In the supplementary processing, for example, information regarding the content of the utterance of the user can be presented as the character information (language). The character information may be presented by image display (captioned display) on the display 42, or output by voice from the speaker 41.

For example, in the supplementary processing, the utterance of the user can be subjected to voice recognition and the character information acquired by the voice recognition as the user's utterance can be presented without any change.

The character information can be presented, for example, by supplementing the character information as the user's utterance with information (subject, object, and the like) missing in the user's utterance from the context of the user's utterance as the interaction context.

In addition, in a case where the character information is displayed by captions, for example, it is possible to emphatically display part or all of the character information by changing the color and/or size of characters in accordance with the state of the user, such as an emotion and intonation of the user who is uttering as the interaction context.

The information regarding the content of the utterance of a user includes supplementary information that supplements a conversation of the user, the supplementary information being estimated on the basis of the interaction context (a context of a conversation, and the like) recognized from the content of the utterance.

The supplementary information includes information that starts a conversation. Examples of the information that starts a conversation include a subject (theme) of a conversation, a question that starts a conversation ("Tell me your story about old times" and the like), and music that starts a conversation (well-known folk song and the like).

In the presentation of the supplementary information, it is possible to display a subject (theme) of a conversation, display a question that starts a conversation, and play music that starts a conversation, in response to an interaction context that a conversation (user's utterance) has stagnated.

The supplementary processing unit 63 may evaluate an interaction context and determine which supplementary processing is to be performed in accordance with the evaluation of the interaction context.

For example, in a case where the interaction context is evaluated that a conversation has become a great conversation by a theme of a conversation as the supplementary information presented in the past, the supplementary processing unit 63 can determine presentation of another theme (another supplementary information) in accordance with the theme presented in the past as the supplementary processing to be performed. Another theme in accordance with the theme presented in the past means the same theme as that presented in the past or a theme ideologically similar to the theme presented in the past.

Besides these, for example, life information (background, hobby, special skill, origin, and the like) of the personally recognized user can be displayed, and elements and/or topics common to the users who have conversation can be presented in the supplementary processing.

In addition, information that is hard to perceive or unable to be perceived by the personally recognized user can be reinforced or converted in the supplementary processing. Reinforcing the information means, for example, increasing a sound volume or adjusting frequency characteristics of a voice so that a user who has a low hearing ability can clearly hear. Converting the information means, for example, converting the name of an object into a voice and then outputting the voice for a blind user, and converting information into a tactile stimulator by which information can be felt by a tactile sense such as vibration and outputting the tactile stimulation means for a deaf user.

Furthermore, in a case where the user on the other end side displayed on the display 42 has not noticed the user on the own side, the telepresence device 11 on the other end side can perform such processing as to direct attention of the user on the other end side toward the user on the own side, as the supplementary processing. For example, the telepresence device 11 can make a sound such as a chime, or recognize the user on the other end side to output the name of the user by voice.

Furthermore, in the supplementary processing, in a case where the user on the own side touches a display area of the user on the other end side on the display 42, the telepresence device 11 on the other end side can recognize the user on the other end side, output the name of the user by voice, and output such a specific voice as to call the user on the other end side. In a case where the user on the other end side wears a device capable of vibrating, the telepresence device 11 on the other end side can perform an operation like stopping the user on the other end side by tapping his/her shoulder, for example by vibrating the device worn by the user on the other end side.

Furthermore, in the supplementary processing, the telepresence device 11 can limit sounds to those in a range displayed on the display 42 and limit voices to those of the users having a conversation, and output the sounds and voices from the speaker 41. In addition, the telepresence device 11 can output the sounds and voices from the speaker 41 by emphasizing the sounds in the range displayed on the display 42 and the voices of the users having the conversation. While the telepresence device 11 can collect sounds in a wide range and transmit the sounds, the elderly people may get bewildered by sounds coming from a range not displayed on the display 42. Limiting or emphasizing the voices and the like as described above can prevent the elderly people from getting bewildered by the sounds output from the range not displayed on the display 42.

In addition, in the supplementary processing, in a case where a conversation becomes lively, the telepresence device 11 can focus on an area of the users participating in the conversation and blur an area remotely related to the conversation, for example, an area of users not participating in the conversation in images displayed on the display 42. In a case where the image to show a wide range of the space on the other end side (at the point) is displayed on the display 42 with a large screen, the user on the own side may possibly be unable to know which part of the image should be focused on. As described above, focusing on the area of the users participating in the conversation and blurring the area remotely related to the conversation can prevent the user not knowing which part of the image displayed on the display 42 should be focused on.

Furthermore, for example, the following operation can be performed in the supplementary processing. Assume that an elderly person exists as the user on the own side and a child exists as the user on the other end side. When the elderly person as the user on the own side takes such an action as to give a New Year's money gift to the child as the user on the other end side, the telepresence device 11 on the own side can withdraw electronic money from an integrated circuit (IC) card or the like of the elderly person on the own side, and the telepresence device 11 on the other end side can charge an IC card of the child on the other end side with the electronic money withdrawn from the IC card or the like of the elderly person on the own side as, so to speak, a New Year's digital money gift. In this case, inter-generation communication between the elderly person and the child can be promoted.

In addition, for example, the following operation can be performed in the supplementary processing. Assume that there is also dagashiya (Japanese penny candy store) at the point on the own side and a candy box that contains candies and the like is arranged at the point on the other end side. When the elderly person on the own side takes such an action to buy candies and the like at the dagashiya and hand over the candies and the like to the child on the other end side, the telepresence device 11 on the other end side can recognize the candies and the like handed over by the elderly person on the own side, discharge candies and the like same as the candies and the like from the candy box, and hand them over to the child on the other end side. In this case, inter-generation communication can be promoted in such a manner that the elderly person on the own side and the child on the other end side eat candies and the like together. Note that the candies and the like can be ordered to an on-line shop in the telepresence device 11 on the own side so as to be delivered to the child on the other end side.

Furthermore, in the supplementary processing, the telepresence device 11 can perform sound source separation to extract a voice of the user who is uttering by beam-forming using a plurality of microphones 31 and perform voice recognition of the voice of the user to display the utterance of the user like a comic speech bubble.

The telepresence device 11 can display the space on the other end side on the display 42 as if the space on the own side (point) and the space on the other end side were directly connected to each other. Furthermore, the telepresence device 11 can display a freely-selected intervening space and the space on the other end side on the display 42 as if the space on the own side and the space on the other end side were connected via the intervening space. The intervening space may be a space that actually exists, or a virtual space (imaginary space) that does not actually exist.

A supplementary object that supplements communication can be arranged (displayed) in the intervening space as the supplementary processing.

For example, an object having a game element can be employed as the supplementary object. The object having the game element is, for example, a game such as shogi and a board game, and a collaborative work tool such as drawing and a puzzle on which the user on the own side and the user on the other end side can work together. Besides these, for example, an agent that supplements communication between the user on the own side and the user on the other end side, such as an agent that provides a conversation topic, can be employed as the supplementary object.

In a case where a plurality of users participates in communication such as a conversation on the own side or the other end side, in the supplementary processing, the telepresence device 11 can appropriately adjust the volume, quality, and sound source position of output sounds of the speaker 41, the brightness, image quality, and clarity (blurring) of images displayed on the display 42, and a range of the space on the other end side reflected in the display 42, and the like, on the basis of data of individual cognitive abilities of the plurality of users, parameters, and the like, to make overall perception of the plurality of users as comfortable as possible.

The sound source position of the output sounds of the speaker 41 can be adjusted by, for example, wavefront synthesis. Besides this, in a case where the speaker 41 is a so-called at-hand speaker that can be placed at hand of the user, the telepresence device 11 can calculate and display an appropriate layout of the at-hand speaker as the speaker 41 as the adjustment of the sound source position of the output sounds of the speaker 41.

In a case where the output sounds of the speaker 41 and the images displayed on the display 42 are not adjusted sufficiently, the telepresence device 11 can visualize the state of the user attributable to insufficient adjustment. For example, the telepresence device 11 can display the state (situation) of the user, such as "Mr. A has difficulty in hearing a little bit", "Mr. B has sound distortion by the hearing aid", and "Mr. C has difficulty in seeing the user on the other end side". In a case where the state of the user on the other end is displayed, the user on the own side can have communication that is easily perceived by the user on the other end side by uttering, moving his/her position, and the like in accordance with the state of the user on the other end side.

In a case where the telepresence device 11 has a function of adjusting the sound source position to a freely-selected location by wavefront synthesis, the telepresence device 11 can form sound fields appropriate for the users, for example, sound fields in which voices are easy for the users to hear by utilizing this function. In addition, distributedly arranging a plurality of microphones 31 at appropriate positions and tuning echo cancellation can generate high-quality voices from voices collected by the plurality of microphones 31.

Processing of Telepresence System 10

Figure 5:
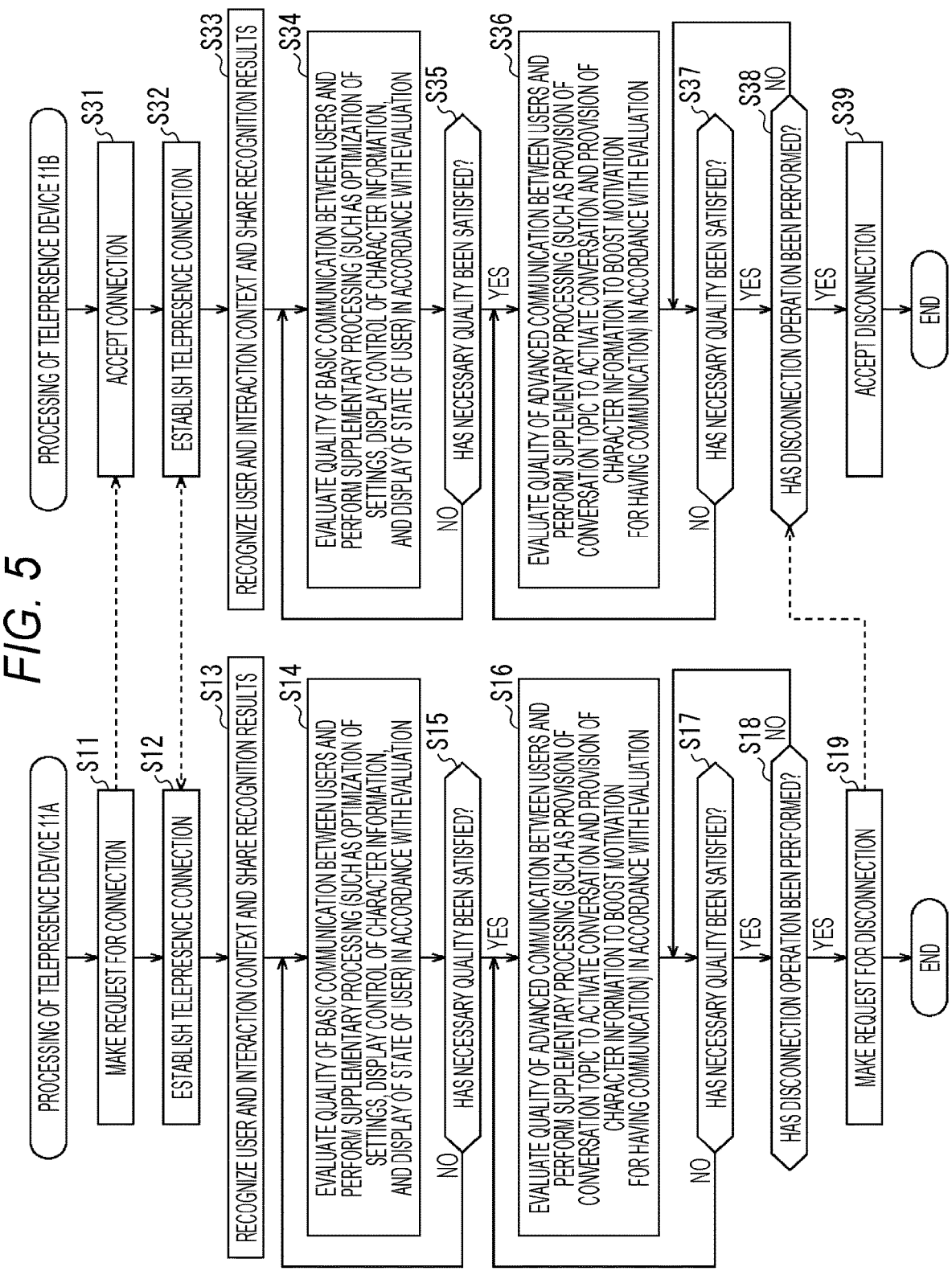
FIG. 5 is a flowchart explaining an example of processing of a telepresence system 10.

FIG. 5 is a flowchart explaining an example of processing of a telepresence system 10.

That is, FIG. 5 is a flowchart illustrating an example of processing of the telepresence devices 11A and 11B in a case where the telepresence device 11A at the point A and the telepresence device 11B at the point B perform bidirectional image and sound communication.

In step S11, the telepresence device 11A makes a request for connection to the telepresence device 11B.

In step S31, the telepresence device 11B accepts the request for connection from the telepresence device 11A.

In step S12, the telepresence device 11A establishes connection with the telepresence device 11B.

In step S32, the telepresence device 11B establishes connection with the telepresence device 11A.

As described above, after establishing connection between the telepresence devices 11A and 11B, the telepresence devices 11A and 11B start bidirectional image and sound communication in real time therebetween.

In step S13, the telepresence device 11A starts to recognize a user at the point A and an interaction context. The telepresence device 11A then sends a result of recognizing the user and a result of recognizing the interaction context to the telepresence device 11B and the server 12, as necessary.

In step S33, the telepresence device 11B starts to recognize a user at the point B and an interaction context. The telepresence device 11B then sends a result of recognizing the user and a result of recognizing the interaction context to the telepresence device 11A and the server 12, as necessary.

Consequently, the telepresence devices 11A and 11B start to share the result of recognizing the users and the result of recognizing the interaction contexts.

In step S14, the telepresence device 11A evaluates quality of basic communication between the users at the points A and B in accordance with characteristic information of the recognized users and the interaction contexts, and performs supplementary processing in accordance with the evaluation.

The quality of communication is a definition of communication, such as whether the users can have communication with comfort and whether the users are enjoying communication. The quality of basic communication represents quality of images and sounds, serving as a medium of the communication, to the users, in a case where the users in remote locations have communication using the telepresence system 10. For example, the quality of the basic communication represents a degree such as easiness for the users to see (difficulty to see) images, and easiness for the users to hear (difficulty to hear) sounds.

Examples of the supplementary processing in accordance with the evaluation of the quality of the basic communication include optimization of settings of the telepresence device 11A, display control of the character information, and display of the states of the users.

In the optimization of the settings of the telepresence device 11A, the volume, quality, and sound source position of sounds output from the telepresence device 11A, and the brightness or the like of images displayed on the telepresence device 11A are adjusted in accordance with the characteristic information of the user so as to satisfy necessary quality as the quality of basic communication. The optimization of the settings of the telepresence device 11A is performed to make the settings of the telepresence device 11A more appropriate for the entire users at the point A.

Note that the installation locations (positions), heights, orientations, or like of the camera 32 and display 42 can be adjusted to be more appropriate for the entire users where possible. That is, the telepresence device 11A, for example, can cause the users to make such adjustment by displaying a message or the like promoting such adjustment on the display 42.

In the display control of the character information, display control of captions as the character information of the user's utterance is performed, for example. In the display control of the captions, the display position, size, brightness, color, and others of the captions is controlled.

In the display of the states of the users, after the optimization of the settings of the telepresence device 11A is performed, the states of the users are displayed with the settings (situations). For example, the telepresence device 11A causes the display 42 to display the states (statuses) of the users, such as, "Mr. XX has difficulty in hearing" and "Mr. YY has difficulty in seeing images".

In step S15, the telepresence device 11A determines whether necessary quality (predetermined quality) as the quality of the basic communication has been satisfied. In a case where the telepresence device 11A determines that the necessary quality as the quality of the basic communication has not been satisfied (NO in step S15), the processing returns to step S14, and similar processing is repeated.

In addition, in a case where the telepresence device 11A determines that the necessary quality as the quality of the basic communication has been satisfied (YES in step S15), the processing proceeds to step S16.

In step S16, the telepresence device 11A evaluates quality of advanced communication between the users at the points A and B in accordance with characteristic information of the recognized users and the interaction contexts, and performs supplementary processing in accordance with the evaluation.

The quality of advanced communication represents a degree at which the users enjoy communication. For example, the telepresence device 11A recognizes whether the user is enjoying communication by a conversation with the other party, a body language, and the like, and whether the user can have interactive (bidirectional) communication by responding in good tempo, from information sensed by the input device 21, and evaluates the quality of the advanced communication.

Examples of the supplementary processing in accordance with the evaluation of the quality of the advanced communication include providing a conversation topic (what is called a story) that activates a conversation, providing character information that boosts motivation for having communication, and the like.

In the provision of the character information that boosts motivation for having communication, for example, the telepresence device 11A estimates the user's emotion and/or intention as the recognition of the interaction context, and can change display of captions as the character information of the user's utterance in accordance with the emotion and/or intention. For example, the telepresence device 11A can emphasize part of all of the captions, and add words, sentences, and the like that supplement the meaning and content of the utterance.

Note that the processing in steps S14 and S16 can be performed in parallel.

In step S17, the telepresence device 11A determines whether necessary quality (predetermined quality) as the quality of the advanced communication has been satisfied. In a case where the telepresence device 11A determines that the necessary quality as the quality of the advanced communication has not been satisfied (NO in step S17), the processing returns to step S16, and similar processing is repeated.

In addition, in a case where the telepresence device 11A determines that the necessary quality as the quality of the advanced communication has been satisfied (YES in step S17), the processing proceeds to step S18.

In step S18, the telepresence device 11A determines that an operation for disconnection from the telepresence device 11B has been performed. In a case where the telepresence device 11A determines that the operation has not been performed (NO in step S18), the processing returns to step S17.

In a case where the telepresence device 11A determines that the operation for disconnection from the telepresence device 11B has been performed (YES in step S18), the processing proceeds to step S19.

In step S19, the telepresence device 11A makes a request for disconnection to the telepresence device 11B. The telepresence device 11A then disconnects from the telepresence device 11B and the processing ends.

On the other hand, the telepresence device 11B performs processing in steps S34 to S37 similar to the processing in steps S14 to S17.

Subsequently, in step S38, the telepresence device 11B determines whether a request for disconnection from the telepresence device 11A has been made from the telepresence device 11A. In a case where the telepresence device 11B determines that no request has been made (NO in step S38), the processing returns to step S37.

In addition, in a case where the telepresence device 11B determines that the request for disconnection from the telepresence device 11A has been made (YES in step S38), the processing proceeds to step S39.

In step S39, the telepresence device 11B accepts the request for disconnection from the telepresence device 11A and disconnects from the telepresence device 11A, and the processing ends.

Figure 6:
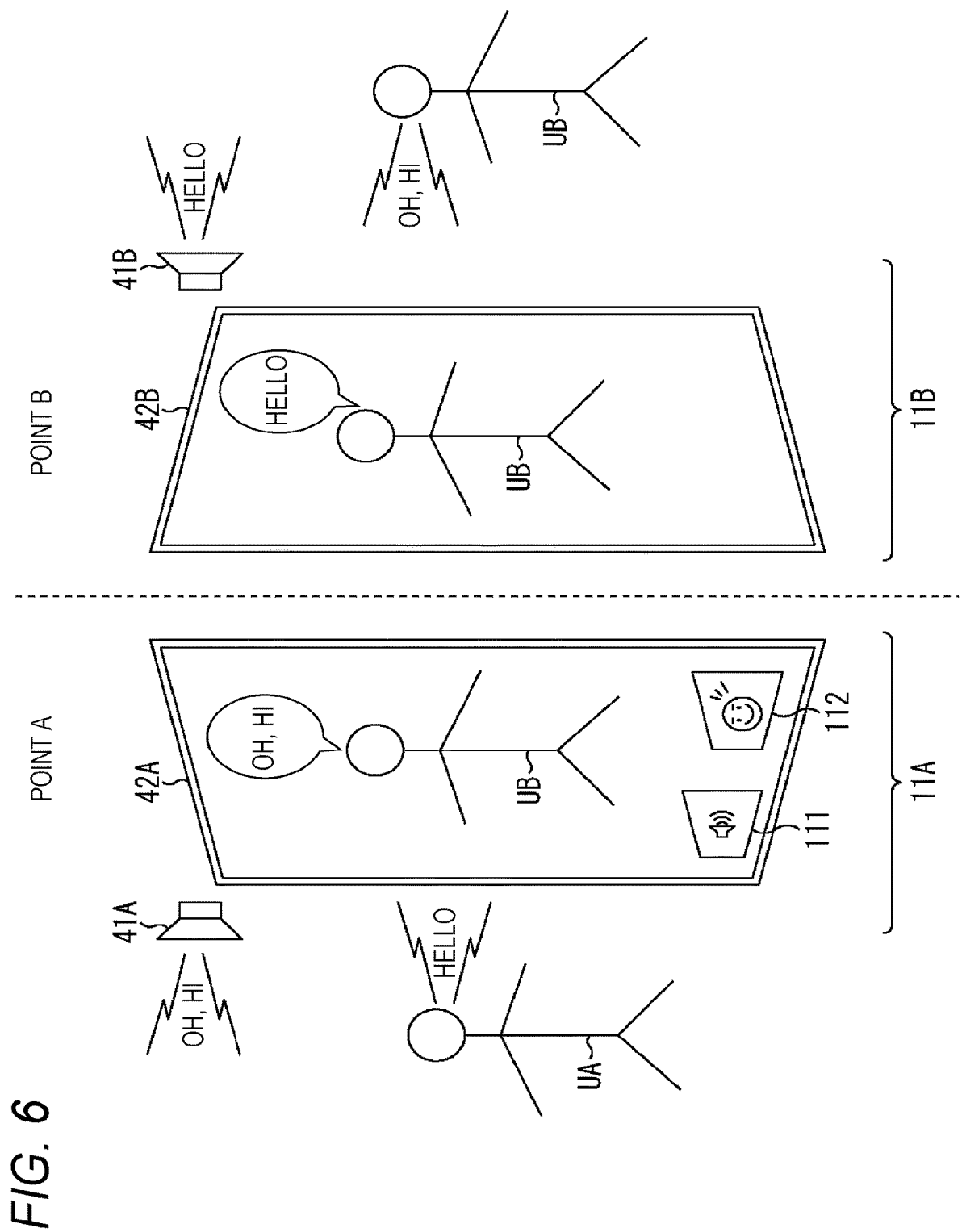
FIG. 6 is a diagram illustrating an example of how communication using the telepresence system 10 proceeds.

FIG. 6 is a diagram illustrating an example of how communication using the telepresence system 10 proceeds. Note that in FIG. 6, a speaker 41A and a display 42A represent the speaker 41 and display 42 of the telepresence device 11A at the point A, respectively. A speaker 41B and a display 42B represent the speaker 41 and display 42 of the telepresence device 11B at the point B, respectively. This also applies to FIGS. 7 and 8, which will be described later.

In FIG. 6, an image of a user UA at the point A captured by the telepresence device 11A is displayed on the display 42B of the telepresence device 11B. Furthermore, an image of a user UB at the point B captured by the telepresence device 11B is displayed on the display 42A of the telepresence device 11A. The user UA at the point A is then trying to start communication with the user UB at the point B by uttering "Hello" to speak to the user UB.

In this case, the utterance "Hello" of the user UA is output by voice from the speaker 41B at the point B. At the same time, a caption (character information) of the utterance "Hello" of the user UA is displayed in a speech bubble on the display 42B at the point B, as if the user UA were making the utterance.

When the user UB at the point B replies to the utterance "Hello" of the user UA at the point A by uttering "Oh, hi", the utterance of "Oh, hi" replied by the user UB is output by voice from the speaker 41A at the point A. At the same time, a caption "Oh, hi" of the utterance "Oh, hi" of the user UB is displayed in a speech bubble on the display 42A at the point A, as if the user UB were uttering.

The users UA and UB can confirm the utterances of the other party by the captions besides by voice, as described above.

For example, in a subsequent conversation between the users UA and UB, part or all of captions of utterances of the users can be displayed by being emphasized in accordance with the users' emotions or the like acquired from the interaction contexts so that the users' emotions can be conveyed. This can facilitate smooth communication.

Here, in a conversation, for example, a hard-of-hearing user may be concerned about whether his/her own voice reaches the other end side or whether his/her own voice is appropriate in volume in some cases.

The display 42 thus can display a volume UI representing the volume of the user's voice and a state UI representing a reaction or the state of attentive hearing of the user on the other end side as the supplementary processing.

In FIG. 6, a volume UI 111 and a state UI 112 are displayed on the display 42A.

The user UA can check a volume level of his/her own voice by referring to the volume UI 111. In addition, the user UA can check whether the user UB on the other end side has noticed the user UA by referring to the state UI 112. A person, when speaking to the other party, may lose his/her confidence in speaking to someone if he/she gets no reaction from (is neglected by) the other party, leading to a drop in motivation for having communication in some cases. On the other hand, the other party who has been spoken to does not notice that he/she has been spoken to because of a small voice of the person who has spoken to him/her, resulting in unintentional neglect in some cases.

With the volume UI 111 and the state UI 112, for example, the user can confirm that the other party does not notice that he/she has been spoken to because of the small voice, and understand the reason for no reaction from the other party. This can prevent the loss of confidence in speaking to someone.

In addition, with the volume UI 111 and the state UI 112, for example, the user can confirm that his/her voice is appropriate in volume and speaking to the other party by such a voice can make the other party notice that he/she has been spoken to. This can increase confidence in speaking to someone, and boost motivation for having communication.

FIG. 7 is a diagram illustrating another example of how communication using the telepresence system 10 proceeds. In FIG. 7, the user UB at the point B is about to pass in front of the display 42B, which is displayed on the display 42A at the point A.

In a case where the user UA at the point A, who has noticed the user UB reflected in the display 42A and being about to pass in front of the display 42B, is trying to communicate with the user UB, the user UA can touch (a display area of) the user UB displayed on the display 42A as if actually calling the user UB.

In a case where the user UA touches the user UB displayed on the display 42A, information of the touch is sent from the telepresence device 11A at the point A to the telepresence device 11B at the point B. In this case, in the telepresence device 11B at the point B, a voice to call the user UB (for example, "Mr. UB, Mr. UA is calling you") is output from the speaker 41B.

Furthermore, in a case where the user UB wears a wearable device 121 such as a wrist watch that vibrates, the telepresence device 11B vibrates the wearable device 121 worn by the user UB.

This makes the user UB notice (calling of) the user UA, and can start communication.

Figure 8:
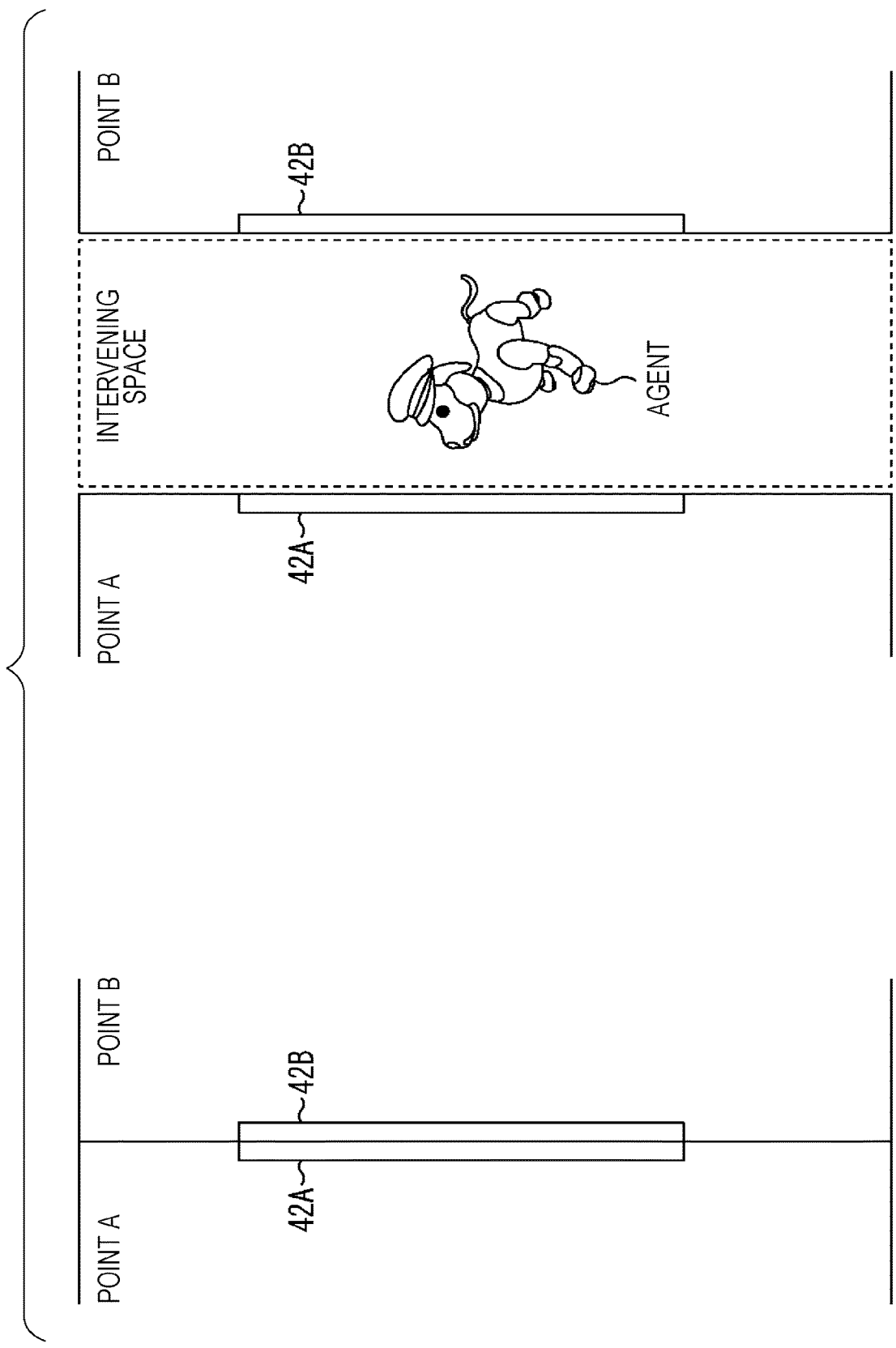
FIG. 8 is a diagram explaining a space displayed by the telepresence system 10.

FIG. 8 is a diagram explaining a space displayed by the telepresence system 10.

The telepresence device 11 can display the space at the other end side on the display 42 as if (the space at) the point A and (the space at) the point B were directly connected to each other, as illustrated in A of FIG. 8, In addition, the telepresence device 11 can display the intervening space and the space on the other end side on the display 42, as if the point A and the point B were connected via the intervening space, as illustrated in B of FIG. 8.

The agent serving as the supplementary object that supplements communication can be arranged (displayed) in the intervening space as the supplementary processing, for example. In FIG. 8, an agent imitating a dog is arranged in the intervening space, which can promote communication between the user at the point A and the user at the point B with the presence or action of the agent serving as a conversation topic.

Furthermore, in communication between the user UA at the point A and the user UB at the point B, the agent can perform, for example, such supplementary processing as to present a conversation topic at an appropriate timing in accordance with the interaction context such as a context of a past conversation or current conversation between the users UA and UB.

As described above, the telepresence device 11 can facilitate smooth communication by performing the supplementary processing of supplementing communication in accordance with the interaction context.

Note that part of the processing performed by the telepresence device 11 can be performed by the server 12.

Description of Computer According to an Embodiment of the Present Technology

Next, the series of processing of the signal processing device 23 described above can be performed by hardware or software. In a case where the series of processing is performed by software, a program that constitutes the software is installed in a general-purpose computer, or the like.

Figure 9:
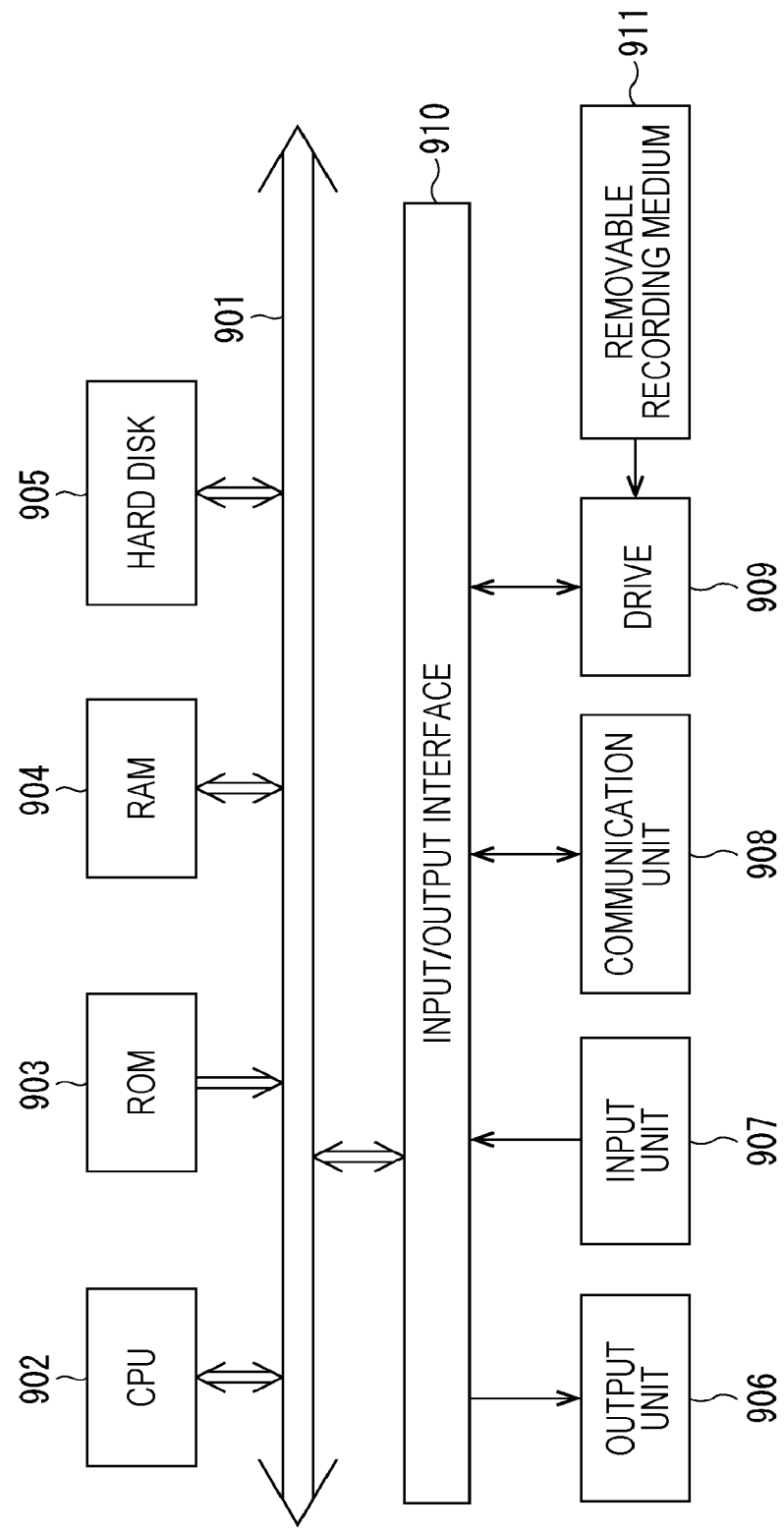
FIG. 9 is a block diagram illustrating a configuration example of a computer according to an embodiment of the present technology.

FIG. 9 is a block diagram illustrating a configuration example of an embodiment of a computer in which a program for executing the above-mentioned series of processing is installed.

It is possible to record the program in advance on a hard disk 905 or a ROM 903 serving as a recording medium incorporated in the computer.

Alternatively, the program can be stored (recorded) on a removable recording medium 911 driven by a drive 909. It is possible to provide such removable recording medium 911 as so-called packaged software. In this regard, an example of the removable recording medium 911 includes, for example, a flexible disk, a compact disc read-only memory (CD-ROM), a magneto-optical (MO) disk, a digital versatile disc (DVD), a magnetic disk, and a semiconductor memory.

Moreover, it is possible to install the program in the computer from the removable recording medium 911 as described above or can be downloaded to the computer via a communication network or a broadcasting network to be installed in the hard disk 905 included therein. That is, in one example, it is possible to transfer the program to the computer from a download site via a satellite for digital satellite broadcasting in a wireless manner or to transfer it to the computer via a network such as a local area network (LAN) or the Internet in a wired manner.

The computer has a built-in central processing unit (CPU) 902, and an input/output interface 910 is connected to the CPU 902 via a bus 901.

When a command is input to the CPU 902 via the input/output interface 910 by a user operating an input unit 907 or the like, the CPU 902 executes the program stored in the read-only memory (ROM) 903 in accordance with the command. Alternatively, the CPU 902 loads the program stored in the hard disk 905 into a random access memory (RAM) 904 and executes the program.

This allows the CPU 902 to execute the processing in accordance with the above-mentioned flowchart or the processing performed by using the configuration of the above-mentioned block diagram. Then, in one example, the CPU 902 outputs the result obtained by the processing through an output unit 906 or transmits the result through a communication unit 908 via the input/output interface 910 as necessary and stores the result in the hard disk 905.

Moreover, the input unit 907 includes a keyboard, a mouse, a microphone, or the like. In addition, the output unit 906 includes a liquid crystal display (LCD), a speaker, or the like.

In this regard, in this specification, the computer does not necessarily perform the processing in accordance with the program in order shown in the flowchart in a time series. That is, the processing performed by the computer in accordance with the program also includes processing executed in parallel or individually (e.g., parallel processing or object-oriented processing). Further, the program may be processed by a single computer (processor) or dispersedly process it by a plurality of computers. Furthermore, it is possible to transfer the program to a remote computer for execution. Furthermore, in this specification, a system means a set of a plurality of constituent elements (device, module (component), and the like), and all the constituent elements may or may not be received in the same housing. Thus, a plurality of devices received in different housings and connected via a network, and any single device in which a plurality of modules is received in a single housing are both a system.

Moreover, embodiments of the present technology are not limited to the above embodiment, and various kinds of modification can be performed within the scope of the present technology.

In one example, the present technology can employ cloud-computing configuration in which a single function is shared by a plurality of devices via a network and is cooperatively processed by the plurality of devices. Furthermore, the above-mentioned steps shown in the flowcharts can be executed by a single device or can be shared and executed by a plurality of devices.

Furthermore, in a case where a plurality of processes is included in a single step, the plurality of processes included in the single step can be executed by a single device or can be shared and executed by a plurality of devices.

Furthermore, the effects described in this specification are merely examples and are not limited, and other effects may be exerted.

Additionally, the present technology may also be configured as below.

<1>
An information processing device, including:
a supplementary processing unit configured to perform supplementary processing of supplementing communication between users at a plurality of points in accordance with a context of interaction between the users at the respective points in a telepresence system configured to perform bidirectional image and sound communication for the communication.

<2>
The information processing device according to <1>, further including
a context recognition unit configured to recognize the context.

<3>
The information processing device according to <2>, in which
the context recognition unit is configured to recognize a state of a corresponding user of the users.

<4>
The information processing device to <2> or <3>, in which the context recognition unit is configured to recognize at least one of a context of a past conversation held by the users or a context of a current conversation being held by the users.

<5>
The information processing device to any one of <1> to <4>, in which
the supplementary processing unit is configured to present information regarding a content of an utterance of a corresponding user of the users as character information.

<6>
The information processing device according to <5>, in which
the supplementary processing unit is configured to display the character information or output the information regarding the content of the utterance of the corresponding user by voice.

<7>
The information processing device according to <5> or <6>, in which
the information regarding the content of the utterance of the corresponding user includes supplementary information that supplements a conversation, the supplementary information being estimated on the basis of the context recognized from the content of the utterance.

<8>
The information processing device according to <7>, in which
the supplementary information includes information that starts a conversation.

<9>
The information processing device according to any one of <5> to <8>, in which
the supplementary processing unit is configured to evaluate the context and determine which supplementary processing is to be performed in accordance with the evaluation of the context.

<10>
The information processing device according to <9>, in which
the supplementary processing unit is configured to evaluate whether a conversation has become a great conversation by supplementary information that supplements a conversation and is presented in a past time.

<11>
The information processing device according to <10>, in which
the supplementary processing unit is configured to determine, in a case where the conversation has become the great conversation by the supplementary information presented in the past time, presentation of another supplementary information in accordance with the supplementary information presented in the past time.

<12>
The information processing device according to any one of <1> to <11>, in which
in the telepresence system, a predetermined intervening space and a space at another end side are displayed as if a space on an own side and the space on the another end side were connected via the predetermined intervening space, and
the supplementary processing unit is configured to display an agent configured to supplement the communication in the predetermined intervening space.

<13>
An information processing method, including: performing supplementary processing of supplementing communication between users at a plurality of points in accordance with a context of interaction between the users at the respective points in a telepresence system configured to perform bidirectional image and sound communication for the communication.

<14>
A program that causes a computer to function as a supplementary processing unit configured to perform processing, the processing including:
supplementary processing of supplementing communication between users at a plurality of points in accordance with a context of interaction between the users at the respective points in a telepresence system configured to perform bidirectional image and sound communication for the communication.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Telepresence system
11, 11A, 11B Telepresence device
21 Input device
22 Output device
23 Signal processing device
31 Microphone
32 Camera
33 Sensor
41, 41A, 41B Speaker
42, 42A, 42B Display
43 Actuator
51 Signal processing unit
52 Communication unit
53 Recording unit
61 User recognition unit
62 Context recognition unit
63 Supplementary processing unit
111 Volume UI
112 State UI
121 Wearable device
901 Bus 902 CPU
903 ROM
904 RAM
905 Hard disk
906 Output unit
907 Input unit
908 Communication unit
909 Drive
910 Input/output interface
911 Removable recording medium

The invention claimed is:

1. An information processing device, comprising: circuitry configured to
perform supplementary processing to supplement communication between a plurality of users located at a plurality of points, in accordance with a context of interaction between the users at the respective points in a telepresence system, which is configured to perform bidirectional image and sound communication,
determine a quality of communication value indicating a perceived degree to which the users enjoy the communication, and determine whether the quality of communication value is below a predetermined threshold value,
present information regarding a content of an utterance of a corresponding user of the plurality of users as character information, wherein the information regarding the information, the supplementary information being estimated based on the context recognized from the content of the utterance,
when determining that the quality of communication value is below the predetermined threshold value, present supplementary information that indicates a suggested conversation topic for the plurality of users, and
repeat the determining and presenting steps until the quality of communication value exceeds the predetermined threshold value.

2. The information processing device according to claim 1, wherein the circuitry is further configured to recognize the context of interaction.

3. The information processing device according to claim 2, wherein the circuitry is further configured to recognize a state of a corresponding user of the plurality of users.

4. The information processing device to claim 2, wherein the circuitry is further configured to recognize at least one of a context of a past conversation held by the plurality of users or a context of a current conversation being held by the plurality of users.

5. The information processing device according to claim 1, wherein the circuitry is further configured to display the character information or output the information regarding the content of the utterance of the corresponding user by voice.

6. The information processing device according to claim 1, wherein the circuitry is further configured to evaluate the context and determine which supplementary processing is to be performed, in accordance with the evaluation of the context.

7. The information processing device according to claim 6, wherein the circuitry is further configured to evaluate whether a conversation has become a particular conversation, based on particular supplementary information that supplements a conversation and was presented at a past time.

8. The information processing device according to claim 7, wherein the circuitry is further configured to determine, when the conversation has become the particular conversation based on the particular supplementary information presented at the past time, presentation of other supplementary information, in accordance with the particular supplementary information presented at the past time.

9. The information processing device according to claim 1, wherein in the telepresence system, a predetermined intervening space and a space at another end side are displayed as if a space on an own side and the space on the another end side were connected via the predetermined intervening space, and the circuitry is further configured to display, in the predetermined intervening space, an agent configured to supplement the communication.

10. The information processing device of claim 1, wherein the circuitry is further configured to determine the supplemental information that indicates the suggested conversation topic, based on a past conversation between the plurality of users.

11. An information processing method, comprising:
performing supplementary processing to supplement communication between a plurality of users located at a plurality of points, in accordance with a context of interaction between the users at the respective points in a telepresence system, which is configured to perform bidirectional image and sound communication for the communication,
determining a quality of communication value indicating a perceived degree to which the users enjoy the communication, and determining whether the quality of communication value is below a predetermined threshold value,
presenting information regarding a content of an utterance of a corresponding user of the plurality of users as character information, wherein the information regarding information, the supplementary information being estimated based on the context recognized from the content of the utterance,
when determining that the quality of communication value is below the predetermined threshold value, presenting supplementary information that indicates a suggested conversation topic for the plurality of users, and
repeating the determining and presenting steps until the quality of communication value exceeds the predetermined threshold value.

12. A non-transitory computer-readable medium storing a program that, when executed, causes a computer to perform a method comprising:
performing supplementary processing to supplement communication between a plurality of users located at a plurality of points, in accordance with a context of interaction between the users at the respective points in a telepresence system, which is configured to perform bidirectional image and sound communication for the communication,
determining a quality of communication value indicating a perceived degree to which the users enjoy the communication, and determining whether the quality of communication value is below a predetermined threshold value,
presenting information regarding a content of an utterance of a corresponding user of the plurality of users as character information, wherein the information regarding the content of the utterance of the corresponding user includes the supplementary information, the supplementary information being estimated based on the context recognized from the content of the utterance, when determining that the quality of communication value is below the predetermined threshold value, presenting supplementary information that indicates a suggested conversation topic for the plurality of users, and repeating the determining and presenting steps until the quality of communication value exceeds the predetermined threshold value.

\* \* \* \* \*